United States Patent
Yan

(10) Patent No.: US 10,768,944 B2
(45) Date of Patent: Sep. 8, 2020

(54) METHOD AND SYSTEM FOR CUSTOMIZING DESKTOP LAUNCHER OF MOBILE TERMINAL

(71) Applicant: JRD COMMUNICATION INC., Shenzhen, Guangdong Province (CN)

(72) Inventor: Lina Yan, Huizhou (CN)

(73) Assignee: JRD COMMUNICATION INC., Shenzhen, Guangdong Province (CN)

(*) Notice: Subject to any disclaimer, the term of this patent is extended or adjusted under 35 U.S.C. 154(b) by 179 days.

(21) Appl. No.: 15/551,281

(22) PCT Filed: Oct. 27, 2016

(86) PCT No.: PCT/CN2016/103500
§ 371 (c)(1),
(2) Date: Aug. 15, 2017

(87) PCT Pub. No.: WO2017/118170
PCT Pub. Date: Jul. 13, 2017

(65) Prior Publication Data
US 2018/0046472 A1 Feb. 15, 2018

(30) Foreign Application Priority Data
Jan. 6, 2016 (CN) .......................... 2016 1 0013332

(51) Int. Cl.
*G06F 9/445* (2018.01)
*G06F 9/451* (2018.01)

(52) U.S. Cl.
CPC .......... *G06F 9/44505* (2013.01); *G06F 9/453* (2018.02)

(58) Field of Classification Search
None
See application file for complete search history.

(56) References Cited

U.S. PATENT DOCUMENTS 8,850,424 B2 * 9/2014 Friedman .............. G06F 9/4451
717/170
8,918,712 B2 * 12/2014 Nario ...................... H04W 4/50
715/239
(Continued)

FOREIGN PATENT DOCUMENTS

| CN | 104461599 A | 3/2015 |
| CN | 104915268 A | 9/2015 |

(Continued)

OTHER PUBLICATIONS

Zhang, "Converting Legacy Desktop Applications into On-Demand Personalized Software", 2009, IEEE (Year: 2009).*

*Primary Examiner* — Hossain M Morshed
(74) *Attorney, Agent, or Firm* — Cheng-Ju Chiang

(57) ABSTRACT

The present disclosure discloses a method for customizing a desktop launcher of a mobile terminal, comprising: placing a resource file and a configuration file for customizing at least two kinds of desktop launchers in a resource folder and a configuration folder, respectively, wherein the files and the folders of the desktop launchers are different in name; adding a compilation command corresponding to the desktop launchers, and copying the files corresponding to the desktop launchers in a saving path to a second file directory; adding the saving path to a program information file; compiling the files in the folders corresponding to the desktop launchers in the second file directory, so as to generate an installation program file; and loading the installation program file corresponding to the desktop launcher selected by the user, so as to execute the corresponding desktop launcher. The present disclosure further provides a system related to the method.

13 Claims, 4 Drawing Sheets

(56) References Cited

U.S. PATENT DOCUMENTS

| | | | | |
|---|---|---|---|---|
| 9,569,198 B2* | 2/2017 | Spivak | ................... | H04L 67/10 |
| 2009/0241104 A1* | 9/2009 | Amiga | ..................... | G06F 8/65 |
| | | | | 717/174 |
| 2009/0288068 A1* | 11/2009 | Gunsel | ..................... | G06F 8/36 |
| | | | | 717/116 |
| 2010/0023738 A1* | 1/2010 | Sheehan | ................ | G06F 9/455 |
| | | | | 713/1 |
| 2012/0204131 A1* | 8/2012 | Hoang | ................ | G06F 3/04817 |
| | | | | 715/835 |
| 2012/0317492 A1* | 12/2012 | Sheeder | ........... | H04N 21/25891 |
| | | | | 715/738 |
| 2013/0219155 A1* | 8/2013 | Barrus | ................. | G06F 9/4401 |
| | | | | 713/1 |
| 2013/0226555 A1* | 8/2013 | Lerum | ................... | G06F 9/454 |
| | | | | 704/2 |
| 2014/0359602 A1* | 12/2014 | Sawaya | ..................... | G06F 8/61 |
| | | | | 717/176 |
| 2015/0370428 A1* | 12/2015 | Chan | .................... | G06F 3/0482 |
| | | | | 715/739 |
| 2017/0286913 A1* | 10/2017 | Liu | ........................ | H04W 4/12 |
| 2018/0046472 A1* | 2/2018 | Yan | .................... | G06F 9/44505 |

FOREIGN PATENT DOCUMENTS

| | | |
|---|---|---|
| CN | 105045643 A | 11/2015 |
| CN | 105677421 A | 6/2016 |

\* cited by examiner

METHOD AND SYSTEM FOR CUSTOMIZING DESKTOP LAUNCHER OF MOBILE TERMINAL

CROSS REFERENCE TO RELATED APPLICATIONS

The present application is a 35 U.S.C. § 371 National Phase conversion of International (PCT) Patent Application No. PCT/CN2016/103500, filed on Oct. 27, 2016, which claims benefit of Chinese Application No. 201610013332.2, filed on Jan. 6, 2016, the disclosure of which is incorporated by reference herein. The PCT International Patent Application was filed and published in Chinese.

TECHNICAL FIELD

The present disclosure generally relates to mobile terminal system, and in particular relate to a method and system for customizing a desktop launcher of a mobile terminal.

BACKGROUND

With the rapid development and progress of modern electronic technology, electronic devices also have seen the corresponding development. Smart phones are widely used in the life of consumers, and users' demands for smart phone interfaces are increasingly diverse. For example, different kinds of consumers have different demands for the theme, wallpaper, layout, application operation mode, etc. The current common demands include; desktop launchers customized for elders, desktop launchers of children mode, standard desktop launcher, and desktop launchers customized by operators. Currently, the smart phones sold in markets are capable of supporting the loading of multiple desktop launchers, but the configuration files and resource files of different desktop launchers are independent from each other, and cannot be shared.

SUMMARY

The purpose of the present disclosure is to provide a method and system for customizing a desktop launcher which implements the sharing or customization of configuration files and resource files on demand.

In order to solve the above-mentioned technical problems, a technical scheme adopted by the present disclosure is to provide a method for customizing a desktop launcher of a mobile terminal, comprising:

Placing a resource file and a configuration file for customizing at least two kinds of desktop launchers in a corresponding resource folder and a corresponding configuration folder, respectively, within a first file directory, wherein the resource file, the resource folder, the configuration file, and the configuration folder of the at least two kinds of desktop launchers are different in name so as to distinguish the resource file and the configuration file for customizing the at least two kinds of desktop launchers, wherein the configuration file for customizing the at least two kinds of desktop launchers at least comprises voice, multimedia, character, language, and layout, the resource file for customizing the at least two kinds of desktop launchers at least comprises an image resource, and the at least two kinds of desktop launchers share the image resource.

Setting function switch value(s) for customizing the at least two kinds of desktop launchers . . .

Adding a compilation command corresponding to the at least two kinds of desktop launchers, specifying a saving path in the first file directory for the resource file and the configuration file corresponding to the at least two kinds of desktop launchers, and copying the resource file and the configuration file corresponding to the at least two kinds of desktop launchers in the save path to a second file directory through the compile command.

Adding the saving path of the resource file and the configuration file corresponding to the at least two kinds of desktop launchers in the second file directory to a program information file, so as to copy the program information file to folders corresponding to the at least two kinds of desktop launchers in the second file directory.

Compiling the resource file and the configuration file in the folders corresponding to the at least two kinds of desktop launchers in the second file directory, respectively, so as to generate a corresponding installation program file.

Loading the corresponding installation program file according to the desktop launcher selected by a user, and executing the corresponding desktop launcher.

In one embodiment, the function switch value(s) at least comprises the amount of main screen and the amount of navigation bar.

In one embodiment, the loading the corresponding installation program file according to the desktop launcher selected by a user, and execute the corresponding desktop launcher comprises:

Setting one of the at least two kinds of desktop launchers as a predetermined desktop launcher.

Displaying a setup wizard interface when a system starts; if a user selects a demanded desktop launcher in the setup wizard interface, loading the installation program file corresponding to the desktop launcher selected by the user, so as to execute the desktop launcher, and setting the desktop launcher selected by the user as a default desktop launcher; if the user does not select the demanded desktop launcher in the setup wizard interface, executing the predetermined desktop launcher, and setting the predetermined desktop launcher as the default desktop launcher.

If the user switches the desktop launcher in a setting interface while the system executes the desktop launcher, loading the installation program file corresponding to the desktop launcher being switched to, so as to execute the desktop launcher, and setting the desktop launcher being switched to as the default desktop launcher.

In one embodiment, the setting one of the at least two kinds of desktop launchers as a predetermined desktop launcher comprises:

Filtering out a package name and a behavior of the at least two kinds of desktop launchers, and adding the package name and the behavior of the desktop launcher to be set to an attribute of a default class, so as to set the desktop launcher as the predetermined desktop launcher.

The setting the desktop launcher selected by the user as a default desktop launcher comprises:

If the user selects the demanded desktop launcher in the setup wizard interface, adding the package name and the behavior of the selected desktop launcher to the attribute of the default class, so as to set the desktop launcher selected by the user as the default desktop launcher, that is, the predetermined desktop launcher will be substituted by the desktop launcher selected by the user.

The setting the desktop launcher being switched to as the default desktop launcher comprises:

If the user switches the desktop launcher while the system executes the desktop launcher, adding the package name and the behavior of the desktop launcher being switched to as the default desktop launcher to the attribute of the default class, so as to set the desktop launcher being switched to as the default desktop launcher, that is, the original default desktop launcher will be substituted by the desktop launcher being switched to.

In order to solve the above-mentioned technical problems, another technical scheme adopted by the present disclosure is to provide another method for customizing a desktop launcher of a mobile terminal, comprising:

Placing a resource file and a configuration file for customizing at least two kinds of desktop launchers in a corresponding resource folder and a corresponding configuration folder, respectively, within a first file directory, wherein the resource file, the resource folder, the configuration file, and the configuration folder of the at least two kinds of desktop launchers are different in name so as to distinguish the resource file and the configuration file for customizing the at least two kinds of desktop launchers.

Adding a compilation command corresponding to the at least two kinds of desktop launchers, specifying a saving path in the first file directory for the resource file and the configuration file corresponding to the at least two kinds of desktop launchers, and copying the resource file and the configuration file corresponding to the at least two kinds of desktop launchers in the save path to a second file directory through the compile command.

Adding the saving path of the resource file and the configuration file corresponding to the at least two kinds of desktop launchers in the second file directory to a program information file, so as to copy the program information file to folders corresponding to the at least two kinds of desktop launchers in the second file directory.

Compiling the resource file and the configuration file in the folders corresponding to the at least two kinds of desktop launchers in the second file directory, respectively, so as to generate a corresponding installation program file.

Loading the corresponding installation program file according to the desktop launcher selected by a user, and executing the corresponding desktop launcher.

In one embodiment, before the adding a compilation command corresponding to the at least two kinds of desktop launchers further comprises:

Setting function switch value(s) for customizing the at least two kinds of desktop launchers, such that the at least two kinds of desktop launchers have the corresponding function switch value(s).

In one embodiment, the function switch value(s) at least comprises the amount of main screen and the amount of navigation bar.

In one embodiment, the loading the corresponding installation program file according to the desktop launcher selected by a user, and execute the corresponding desktop launcher comprises:

Setting one of the at least two kinds of desktop launchers as a predetermined desktop launcher.

Displaying a setup wizard interface when a system starts; if a user selects a demanded desktop launcher in the setup wizard interface, loading the installation program file corresponding to the desktop launcher selected by the user, so as to execute the desktop launcher, and setting the desktop launcher selected by the user as a default desktop launcher; if the user does not select the demanded desktop launcher in the setup wizard interface, executing the predetermined desktop launcher, and setting the predetermined desktop launcher as the default desktop launcher.

If the user switches the desktop launcher in a setting interface while the system executes the desktop launcher, loading the installation program file corresponding to the desktop launcher being switched to, so as to execute the desktop launcher, and setting the desktop launcher being switched to as the default desktop launcher.

In one embodiment, the setting one of the at least two kinds of desktop launchers as a predetermined desktop launcher comprises:

Filtering out a package name and a behavior of the at least two kinds of desktop launchers, and adding the package name and the behavior of the desktop launcher to be set to an attribute of a default class, so as to set the desktop launcher as the predetermined desktop launcher.

The setting the desktop launcher selected by the user as a default desktop launcher comprises:

If the user selects the demanded desktop launcher in the setup wizard interface, adding the package name and the behavior of the desktop launcher selected by the user to the attribute of the default class, so as to set the desktop launcher selected by the user as the default desktop launcher, that is, the predetermined desktop launcher will be substituted by the desktop launcher selected by the user.

The setting the desktop launcher being switched to as the default desktop launcher comprises:

If the user switches the desktop launcher while the system executes the desktop launcher, adding the package name and the behavior of the desktop launcher being switched to as the default desktop launcher to the attribute of the default class, thereby setting the desktop launcher being switched to as the default desktop launcher, that is, the original default desktop launcher will be substituted by the desktop launcher being switched to.

In one embodiment, the configuration file for customizing the at least two kinds of desktop launchers at least comprises voice, multimedia, character, language, and layout, the resource file for customizing the at least two kinds of desktop launchers at least comprises an image resource, and the at least two kinds of desktop launchers share the image resource.

In order to solve the above-mentioned technical problems, still another technical scheme adopted by the present disclosure is to provide a system for customizing a desktop launcher of a mobile terminal, comprising:

A resource management module configured to place a resource file and a configuration file for customizing at least two kinds of desktop launchers in a corresponding resource folder and a corresponding configuration folder, respectively, within a first file directory, wherein the resource file, the resource folder, the configuration file, and the configuration folder of the at least two kinds of desktop launchers are different in name so as to distinguish the resource file and the configuration file for customizing the at least two kinds of desktop launchers.

A resource loading module configured to add a compilation command corresponding to the at least two kinds of desktop launchers, specify a saving path in the first file directory for the resource file and the configuration file corresponding to the at least two kinds of desktop launchers, and copy the resource file and the configuration file corresponding to the at least two kinds of desktop launchers in the save path to a second file directory through the compile command.

A configuration loading module configured to add the saving path of the resource file and the configuration file corresponding to the at least two kinds of desktop launchers in the second file directory to a program information file, so as to copy the program information file to folders corresponding to the at least two kinds of desktop launchers in the second file directory.

A compiling module configured to compile the resource file and the configuration file in the folders corresponding to the at least two kinds of desktop launchers in the second file directory, respectively, so as to generate a corresponding installation program file.

A desktop launcher launching module is configured to load the corresponding installation program file according to the desktop launcher selected by a user, and execute the corresponding desktop launcher.

In one embodiment, the resource loading module is further configured to set function switch value(s) for customizing the at least two kinds of desktop launchers, such that the at least two kinds of desktop launchers have the corresponding function switch value(s).

In one embodiment, the desktop launcher launching module comprises:

A predetermine unit configured to set one of the at least two kinds of desktop launchers as a predetermined desktop launcher.

A loading and configuration unit configured to load the installation program file corresponding to the desktop launcher so as to execute the desktop launcher, and set the loaded desktop launcher as a default desktop launcher.

A setup wizard unit configured to display a setup wizard interface when the system starts; if a user selects a demanded desktop launcher in the setup wizard interface, notifying the loading and configuration unit to load the installation program file corresponding to the desktop launcher selected by the user, so as to execute the desktop launcher, and setting the desktop launcher selected by the user as the default desktop launcher; if the user does not select the demanded desktop launcher in the setup wizard interface, notifying the loading and configuration unit to load the installation program file corresponding to the predetermined desktop launcher, so as to execute the predetermined desktop launcher, and setting the predetermined desktop launcher as the default desktop launcher.

A switching unit configured to, if the user switches the desktop launcher in a setting interface while the system executes the desktop launcher, notify the loading and configuration unit to load the installation program file corresponding to the desktop launcher being switched to, so as to execute the desktop launcher, and setting the desktop launcher being switched to as the default desktop launcher.

In one embodiment, the predetermine unit is configured to filter out a package name and a behavior of the at least two kinds of desktop launchers, and add the package name and the behavior of the desktop launcher to be set to an attribute of a default class, so as to set the desktop launcher as the predetermined desktop launcher;

The loading and configuration unit is configured to, if the user selects the demanded desktop launcher in the setup wizard interface, add the package name and the behavior of the desktop launcher selected by the user to the attribute of the default class, so as to set the desktop launcher selected by the user as the default desktop launcher, that is, the predetermined desktop launcher will be substituted by the desktop launcher selected by the user; if the user switches the desktop launcher while the system executes the desktop launcher, add the package name and the behavior of the desktop launcher being switched to as the default desktop launcher to the attribute of the default class, so as to set the desktop launcher being switched to as the new default desktop launcher, that is, the original default desktop launcher will be substituted by the desktop launcher being switched to.

Different from the prior art, the method for customizing a desktop launcher of a mobile terminal provided by the present disclosure differentiates files of the at least two kinds of desktop launchers by naming resource files and configuration files for customizing the at least two kinds of desktop launchers with different names, thereby implementing the independence between the resource files and the configuration files which have been customized. In addition, the saving path of the at least two kinds of desktop launchers in the second file directory is added to the program information file, so as to copy the program information file to folders corresponding to the at least two kinds of desktop launchers in the second file directory, thereby implementing the sharing of the program information file of the at least two kinds of desktop launchers. As a result, the at least two desktop launchers could implement the independent customization or sharing of configuration file and resource file on demand, while reducing the loading of the system.

DETAILED DESCRIPTION

The disclosure will now be described in detail with reference to the accompanying drawings and examples.

Figure 1:
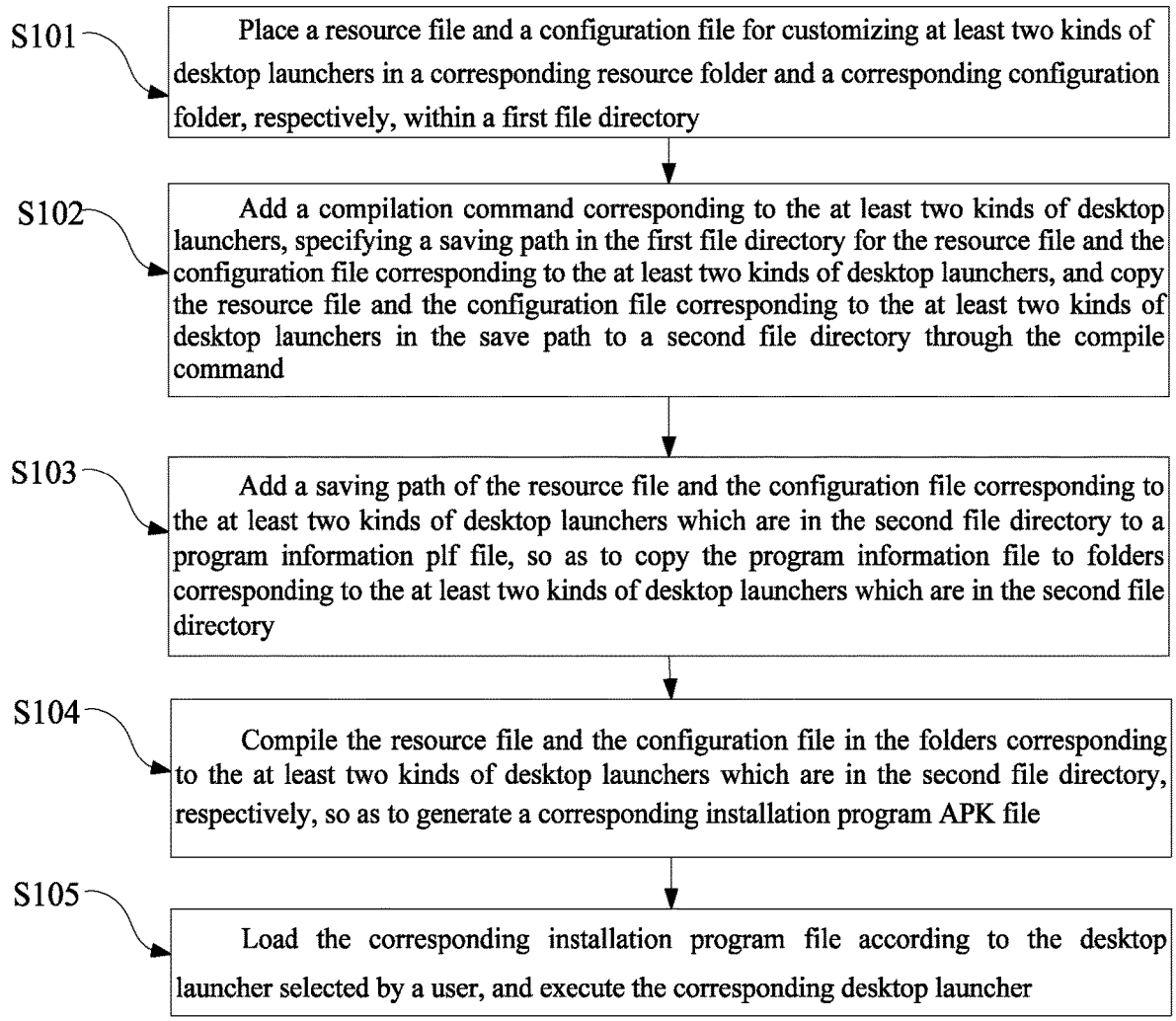
FIG. 1 is a flow chart of a first embodiment of a method for customizing a desktop launcher of a mobile terminal of the present disclosure.

Referring to FIG. 1, a flow chart of a first embodiment of a method for customizing a desktop launcher of a mobile terminal of the present disclosure is depicted. The mobile terminal comprises at least two kinds of desktop launchers, and the at least two kinds of desktop launchers at least comprises a first desktop launcher and a second desktop launcher. The method may comprise the following blocks.

At S101: placing a first resource file for customizing the first desktop launcher and a second resource file for customizing the second launcher into a corresponding resource folder and placing a first configuration file for customizing the first desktop launcher and a second configuration file for customizing the second launcher into a corresponding configuration folder within the first file directory, wherein the resource folder and the configuration folder are within the first file directory.

In one embodiment, the resource files, the resource folder, the configuration files, and the configuration folder of the at least two kinds of desktop launchers may be different in name, thereby distinguishing the resource files and the configuration files for customizing the at least two kinds of desktop launchers.

In one embodiment, each of the configuration files for customizing the at least two kinds of desktop launchers may at least comprise voice, multimedia, character, language, and layout. Each of the resource files for customizing the at least two kinds of desktop launchers may at least comprise an image resource, and the at least two kinds of desktop launchers may share the same image resource.

It could be comprehended that the first file directory could be, but is not limited to, a file directory for a programmer to edit the resource files and the configuration files for the at least two desktop launchers.

At S102: adding a compilation command corresponding to the first desktop launcher and the second desktop launcher, specifying a first saving path of the first resource file and the second resource file and a second saving path of the first configuration file and the second configuration file in the first file directory, and copying the first resource file and the second resource file in the first saving path and the first configuration file and the second configuration file in the second saving path into a second file directory through the compile command.

It could be comprehended that the second file directory may be an application file, e.g., APK file directory.

At S103: adding a third saving path of the first resource file and the second resource file and a fourth saving path of the first configuration file and the second configuration file in the second file directory to a program information file, e.g., PIF file, and respectively copying the program information file to a folder of the first desktop launcher and a folder of the second desktop launcher in the second file directory.

It could be comprehended that copying the same program information file to the folders corresponding to the at least two kinds of desktop launchers which are in the second file directory, so that the at least two kinds of desktop launchers can share the same program information file.

At S104: compiling the first resource file and the first configuration file in the folder of the first desktop launcher which are in the second file directory to generate a first installation program file, e.g., APK file, and compiling the second resource file and the second configuration file in the folder of the second desktop launcher in the second file directory to generate a second installation program file.

It could be comprehended that after a corresponding installation program file is generated, the installation program file could be downloaded to the mobile terminal for loading as an application program.

At S105: loading the first or second installation program file according to the first or second desktop launcher selected by a user, and executing the first or second desktop launcher.

The method for customizing a desktop launcher of a mobile terminal provided by the present disclosure differentiates files of the at least two kinds of desktop launchers by naming resource files and configuration files for customizing the at least two kinds of desktop launchers with different names, thereby implementing the independence between the resource files and the configuration files which have been customized. In addition, the saving paths of the at least two kinds of desktop launchers which is in the second file directory is added into the program information file, so as to respectively copy the program information file to folders corresponding to the at least two kinds of desktop launchers which are in the second file directory, thereby implementing the sharing of the program information file of the at least two kinds of desktop launchers. As a result, the at least two desktop launchers could implement the independent customization or sharing of configuration file and resource file on demand, while reducing the loading of the system.

Figure 2:
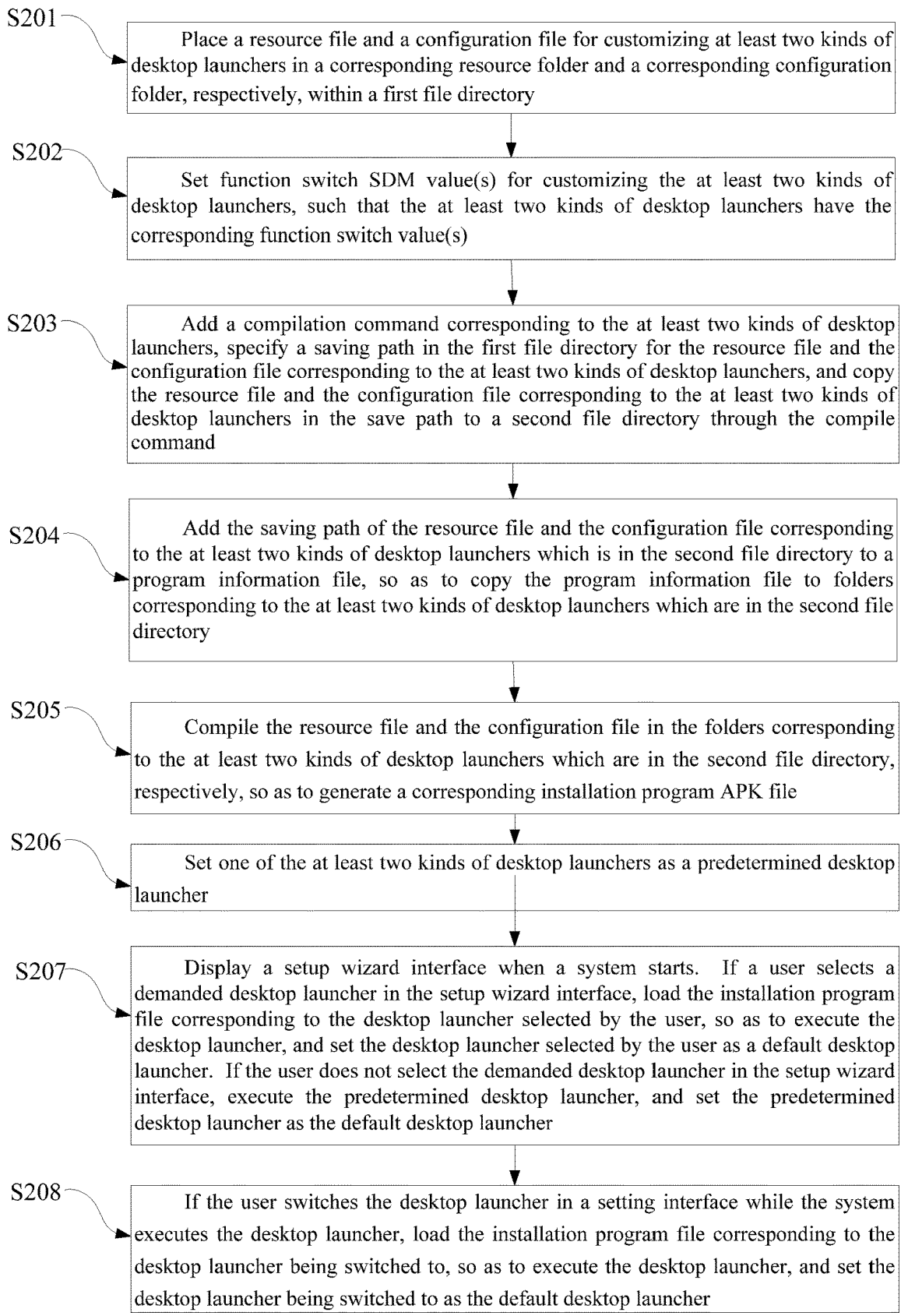
FIG. 2 is a flow chart of a second embodiment of a method for customizing a desktop launcher of a mobile terminal of the present disclosure.

Referring to FIG. 2, a flow chart of a second embodiment of a method for customizing a desktop launcher of a mobile terminal of the present disclosure is depicted. The mobile terminal comprises at least two kinds of desktop launchers, and the at least two kinds of desktop launchers at least comprises a first desktop launcher and a second desktop launcher. The method may comprise the following blocks.

At S201: placing a first resource file for customizing the first desktop launcher and a second resource file for customizing the second launcher into a corresponding resource folder within a first file directory and placing a first configuration file for customizing the first desktop launcher and a second configuration file for customizing the second launcher into a corresponding configuration folder within the first file directory.

In one embodiment, the resource files, the resource folder, the configuration files, and the configuration folder of the at least two kinds of desktop launchers are different in name, thereby distinguishing the resource files and the configuration files for customizing the at least two kinds of desktop launchers.

At S202: setting function switch values for customizing the first desktop launcher and the second desktop launcher, such that the first desktop launcher and the second desktop launcher have a corresponding function switch value, respectively.

In one embodiment, the function switch value(s) may at least comprise the amount of main screens and the amount of navigation bars.

It could be comprehended that if there is no function switch value(s) of the at least two kinds of desktop launchers which differentiated with names, a common attribute configuration for the at least two kinds of desktop launchers will be used.

At S203: adding a compilation command corresponding to the first desktop launcher and the second desktop launcher, specifying a first saving path of the first resource file and the second resource file and a second saving path of the first configuration file and the second configuration file in the first file directory, and copying the first resource file and the second resource file in the first saving path and the first configuration file and the second configuration file in the second saving path into a second file directory through the compile command.

At S204: adding a third saving path of the first resource file and the second resource file and a fourth saving path of the first configuration file and the second configuration file in the second file directory to a program information file, and copying the program information file to a folder of the first desktop launcher and a folder of the second desktop launcher in the second file directory.

At S205: compiling the first resource file and the first configuration file in the folder of the first desktop launcher in the second file directory to generate a first installation program file, e.g., APK file, and compiling the second resource file and the second configuration file in the folder of the second desktop launcher in the second file directory to generate a second installation program file.

It could be comprehended that after a corresponding installation program file is generated, the installation program file could be downloaded to the mobile terminal for loading as an application program.

At S206: setting one of the at least two kinds of desktop launchers as a predetermined desktop launcher.

Particularly, package names and behaviors of the at least two kinds of desktop launchers are filtered out, and the package name and the behavior of one desktop launcher to be set are added to an attribute, e.g., CATEGORY DEFAULT, of a default class, so as to set the desktop launcher as the predetermined desktop launcher.

At S207: displaying a setup wizard interface when a system starts. If a user selects a first or second desktop launcher in the setup wizard interface, loading the first or second installation program file corresponding to the first or second desktop launcher selected by the user, so as to execute the first or second desktop launcher, and setting the first or second desktop launcher selected by the user as a default desktop launcher. If the user does not select the first or second desktop launcher in the setup wizard interface, executing the predetermined desktop launcher, and setting the predetermined desktop launcher as the default desktop launcher.

In one embodiment of S207, the setting the first or second desktop launcher selected by the user as the default desktop launcher comprises: if the user selects the first or second desktop launcher in the setup wizard interface, adding the package name and the behavior of the selected desktop launcher selected by the user to the attribute of the default class, so as to set the first or second desktop launcher selected by the user as the default desktop launcher. That is, the predetermined desktop launcher will be substituted by a desktop launcher selected by the user.

At S208: if the user switches to the second desktop launcher in a setting interface while the system executes the first desktop launcher, loading the second installation program file corresponding to the second desktop launcher being switched to, so as to execute the second desktop launcher, and setting the second desktop launcher being switched to as the default desktop launcher.

In one embodiment of S208, the setting the second desktop launcher being switched to as the default desktop launcher comprises: if the user switches to the second desktop launcher while the system executes the first desktop launcher, adding the package name and the behavior of the second desktop launcher being switched to as the default desktop launcher to the attribute of the default class, so as to set the second desktop launcher being switched to as the default desktop launcher. That is, the original default desktop launcher will be substituted by a desktop launcher being switched to.

The method for customizing a desktop launcher of a mobile terminal provided by the present disclosure differentiates files of the at least two kinds of desktop launchers by naming resource files and configuration files for customizing the at least two kinds of desktop launchers with different names, thereby implementing the independence between the resource files and the configuration files which have been customized. In addition, the saving paths of the at least two kinds of desktop launchers which is in the second file directory is added to the program information file, so as to copy the program information file to folders corresponding to the at least two kinds of desktop launchers which are in the second file directory, thereby implementing the sharing of the program information file of the at least two kinds of desktop launchers. As a result, the at least two desktop launchers could implement the independent customization of configuration file and resource file on demand, while reducing the loading of the system. Furthermore, when a system starts, a setup wizard interface is displayed for a user to select a demanded desktop launcher. If a user selects a desktop launcher in the setup wizard interface, the desktop launcher selected by the user is executed; if the user does not select a desktop launcher in the setup wizard interface, the predetermined desktop launcher is executed, thereby meeting users' demand for desktop launchers.

Figure 3:
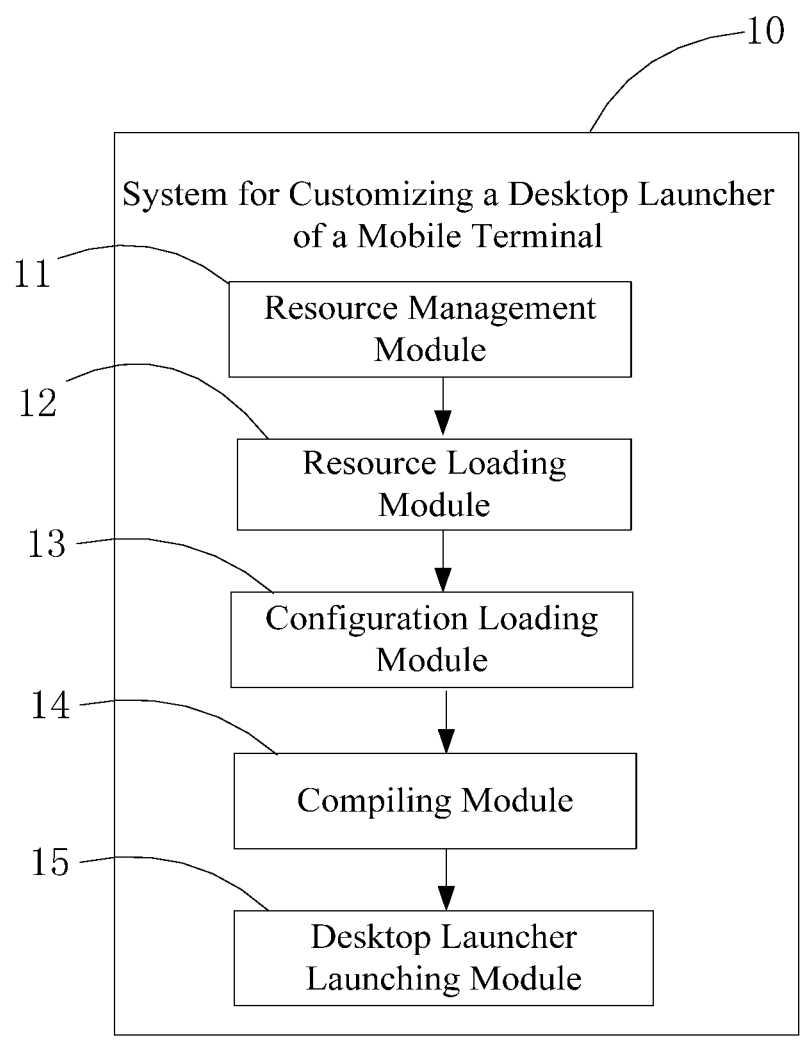
FIG. 3 is a schematic diagram of a first embodiment of a system for customizing a desktop launcher of a mobile terminal of the present disclosure.

Referring to FIG. 3, a schematic diagram of a first embodiment of a system 10 for customizing a desktop launcher of a mobile terminal of the present disclosure is depicted. The mobile terminal comprises at least two kinds of desktop launchers, and the at least two kinds of desktop launchers at least comprises a first desktop launcher and a second desktop launcher. The system 10 may comprise the following components.

A resource management module 11 configured to place a first resource file for customizing the first desktop launcher and a second resource file for customizing the second launcher into a corresponding resource folder within a first file directory and place a first configuration file for customizing the first desktop launcher and a second configuration file for customizing the second launcher into a corresponding configuration folder within the first file directory, wherein the first resource file and the second resource file, the resource folder, the first configuration file and the second configuration file, and the configuration folder are different in name, thereby distinguishing the resource files and the configuration files for customizing the at least two kinds of desktop launchers.

A resource loading module 12 configured to add a compilation command corresponding to the first desktop launcher and the second desktop launcher, specify a first saving path of the first resource file and the second resource file and a second saving path of the first configuration file and the second configuration file in the first file directory, and copy the first resource file and the second resource file in the first saving path and the first configuration file and the second configuration file in the second saving path into a second file directory through the compile command.

A configuration loading module 13 configured to add a third saving path of the first resource file and the second resource file and a fourth saving path of the first configuration file and the second configuration file in the second file directory to a program information file, and copying the program information file to a folder of the first desktop launcher and a folder of the second desktop launcher in the second file directory.

A compiling module 14 configured to compile the first resource file and the first configuration file in the folder of the first desktop launcher in the second file directory to generate a first installation program file, and compile the second resource file and the second configuration file in the folder of the second desktop launcher in the second file directory to generate a second installation program file.

A desktop launcher launching module 15 configured to load the first or second installation program file according to the first or second desktop launcher selected by a user, and executing the first or second desktop launcher.

The system for customizing a desktop launcher of a mobile terminal provided by the present disclosure utilizes the resource management module 11 to differentiate files of the at least two kinds of desktop launchers by naming resource files and configuration files for customizing the at least two kinds of desktop launchers with different names, thereby implementing the independence between the resource files and the configuration files which have been customized. In addition, the system further utilizes the configuration loading module 13 to add the saving paths of the at least two kinds of desktop launchers which is in the second file directory to the program information file, so as to copy the program information file to folders corresponding to the at least two kinds of desktop launchers which are in the second file directory, thereby implementing the sharing of the program information file of the at least two kinds of desktop launchers. As a result, the at least two desktop launchers could implement the independent customization or sharing of configuration file and resource file on demand, while reducing the loading of the system.

Figure 4:
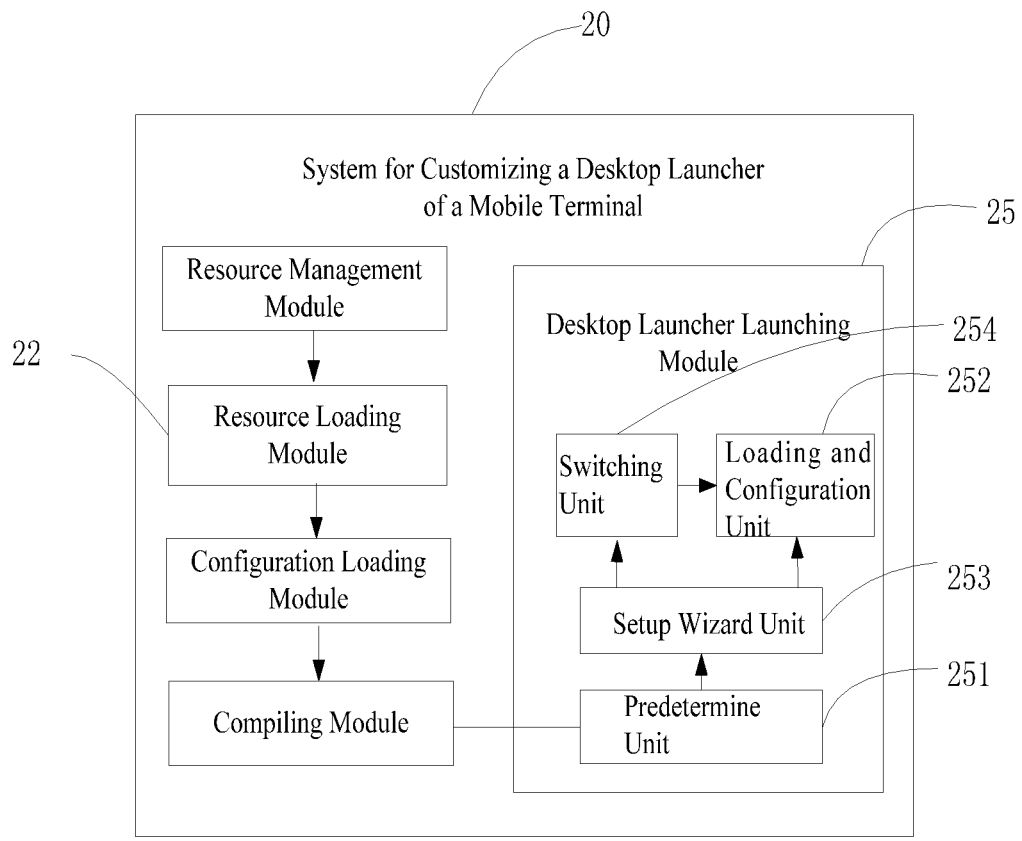
FIG. 4 is a schematic diagram of a second embodiment of a system for customizing a desktop launcher of a mobile terminal of the present disclosure.

Referring to FIG. 4, a schematic diagram of a second embodiment of a system 20 for customizing a desktop launcher of a mobile terminal of the present disclosure is depicted. Basing on the basis of the first embodiment, the system 20 may further comprise the following components.

The resource loading module 22 may be further configured to set function switch values for customizing the first desktop launcher and the second desktop launcher, such that the first desktop launcher and the second desktop launcher have a corresponding function switch value, respectively.

The desktop launcher launching module 25 may further comprise:

A predetermine unit 251 configured to set one of the at least two kinds of desktop launchers as a predetermined desktop launcher.

Particularly, the predetermine unit 251 may be configured to filter out package names and behaviors of the at least two kinds of desktop launchers, and add the package name and the behavior of one desktop launcher to be set to an attribute of a default class, so as to set the desktop launcher as the predetermined desktop launcher.

A loading and configuration unit 252 configured to load the installation program file corresponding to the desktop launcher, so as to execute the desktop launcher, and setting the desktop launcher as a default desktop launcher.

Particularly, the loading and configuration unit 252 may be configured to, if the user selects the first or second desktop launcher in the setup wizard interface, add the package name and the behavior of the first or second desktop launcher selected by the user to the attribute of the default class, so as to set the first or second desktop launcher selected by the user as the default desktop launcher, that is, the predetermined desktop launcher will be substituted by the first or second desktop launcher selected by the user; if the user switches to the second desktop launcher in a setting interface while the system executes the first desktop launcher, add the package name and the behavior of the second desktop launcher being switched to as the default desktop launcher to the attribute of the default class, so as to set the second desktop launcher being switched to as a new default desktop launcher, that is, the original default desktop launcher will be substituted by the second desktop launcher being switched to.

A setup wizard unit 253 configured to display a setup wizard interface when the system starts. If a user selects a demanded desktop launcher in the setup wizard interface, notifying the loading and configuration unit 252 to load the installation program file corresponding to the demanded desktop launcher selected by the user, so as to execute the demanded desktop launcher, and setting the demanded desktop launcher selected by the user as the default desktop launcher. If the user does not select the demanded desktop launcher in the setup wizard interface, notifying the loading and configuration unit 252 to load the installation program file corresponding to the predetermined desktop launcher, so as to execute the predetermined desktop launcher, and setting the predetermined desktop launcher as the default desktop launcher.

A switching unit 254 configured to, if the user switches to the second desktop launcher in a setting interface while the system executes the first desktop launcher, notify the loading and configuration unit 252 to load the second installation program file corresponding to the second desktop launcher being switched to, so as to execute the second desktop launcher, and setting the second desktop launcher being switched to as the default desktop launcher.

The method for customizing a desktop launcher of a mobile terminal provided by the present disclosure differentiates files of the at least two kinds of desktop launchers by naming resource files and configuration files for customizing the at least two kinds of desktop launchers with different names, thereby implementing the independence between the resource files and the configuration files which have been customized. In addition, the saving paths of the at least two kinds of desktop launchers which is in the second file directory is added to the program information file, so as to copy the program information file to folders corresponding to the at least two kinds of desktop launchers which are in the second file directory, thereby implementing the sharing of the program information file of the at least two kinds of desktop launchers. As a result, the at least two desktop launchers could implement the independent customization of configuration file and resource file on demand, while reducing the loading of the system. Furthermore, when a system starts, a setup wizard interface is displayed for a user to selects a demanded desktop launcher. If a user selects the desktop launcher in the setup wizard interface, the desktop launcher selected by the user is executed; if the user does not select the demanded desktop launcher in the setup wizard interface, the predetermined desktop launcher is executed, thereby meeting users' demand for desktop launchers.

Figure 5:
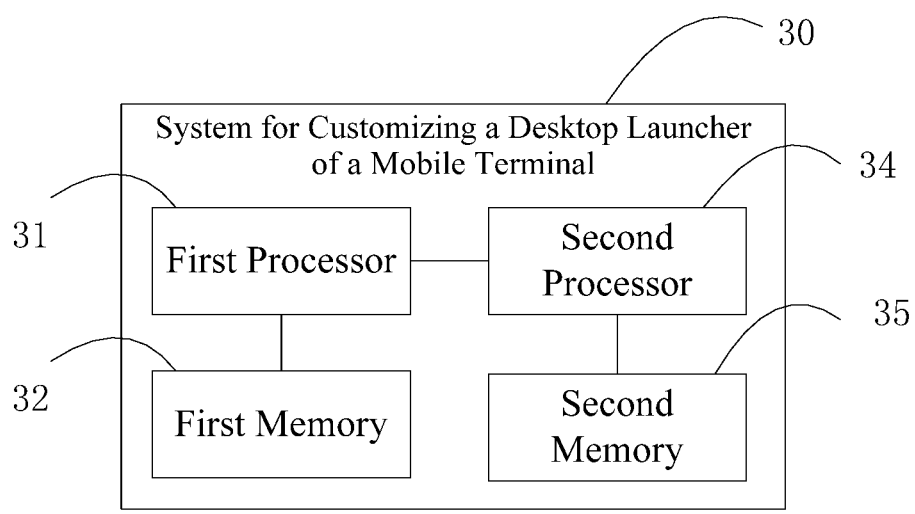
FIG. 5 is a schematic diagram of a structure of a physical device of a system for customizing a desktop launcher of a mobile terminal of the present disclosure.

Referring to FIG. 5, a schematic diagram of a structure of a physical device of a system 30 for customizing a desktop launcher of a mobile terminal of the present disclosure is depicted. The mobile terminal comprises at least two kinds of desktop launchers, and the at least two kinds of desktop launchers at least comprises a first desktop launcher and a second desktop launcher. The system 30 may comprise a first processor 31, a first memory 32, a second processor 34 and a second memory 35. The first processor 31 is coupled to the first memory 32, and the second processor 34 is coupled to the second memory 35.

The first processor 31 may be configured to place a first resource file for customizing the first desktop launcher and a second resource file for customizing the second launcher into a corresponding resource folder within a first file directory and place a first configuration file for customizing the first desktop launcher and a second configuration file for customizing the second launcher into a corresponding configuration folder within the first file directory, wherein the first resource file and the second resource file, the resource folder, the first configuration file and the second configuration file, and the configuration folder are different in name, thereby distinguishing the resource files and the configuration files for customizing the at least two kinds of desktop launchers.

The first processor 31 may be further configured to add a compilation command corresponding to the first desktop launcher and the second desktop launcher, specify a first saving path of the first resource file and the second resource file and a second saving path of the first configuration file and the second configuration file in the first file directory, and copy the first resource file and the second resource file in the first saving path and the first configuration file and the second configuration file in the second saving path into a second file directory through the compile command.

The first processor 31 may be further configured to add a third saving path of the first resource file and the second resource file and a fourth saving path of the first configuration file and the second configuration file in the second file directory to a program information file, and copying the program information file to a folder of the first desktop launcher and a folder of the second desktop launcher in the second file directory.

The first processor 31 may be further configured to compile the first resource file and the first configuration file in the second file directory to generate a first installation program file, and compile the second resource file and the second configuration file in the folder of the second desktop launcher in the second file directory to generate a second installation program file.

The first memory 32 may be configured to store the resource files and the configuration files in the first file directory and the installation program files generated by compiling.

The second processor 34 may be configured to set one of the at least two kinds of desktop launchers as a predetermined desktop launcher.

Particularly, the second processor 34 may be configured to filter out package names and behaviors of the at least two kinds of desktop launchers, and add the package name and the behavior of one desktop launcher to be set to an attribute of a default class, so as to set the desktop launcher as the predetermined desktop launcher.

The second processor 34 may be further configured to load the first or second installation program file corresponding to the first or second desktop launcher, so as to execute the first or second desktop launcher, and set the first or second desktop launcher as a default desktop launcher.

Particularly, the second processor 34 may be configured to, if the user selects the first or second desktop launcher in the setup wizard interface, add the package name and the behavior of the first or second desktop launcher selected by the user to the attribute of the default class, so as to set the first or second desktop launcher selected by the user as the default desktop launcher, that is, the predetermined desktop launcher will be substituted by the first or second desktop launcher selected by the user; if the user switches to the second desktop launcher in a setting interface while the system executes the first desktop launcher, add the package name and the behavior of the second desktop launcher being switched to as the default desktop launcher to the attribute of the default class, so as to set the second desktop launcher being switched to as a new default desktop launcher, that is, the original default desktop launcher will be substituted by the second desktop launcher being switched to.

The second processor 34 may be further configured to display a setup wizard interface when a system starts. If a user selects a demanded desktop launcher in the setup wizard interface, loading the installation program file corresponding to the demanded desktop launcher selected by the user, so as to execute the demanded desktop launcher, and setting the demanded desktop launcher selected by the user as a default desktop launcher. If the user does not select the demanded desktop launcher in the setup wizard interface, executing the predetermined desktop launcher, and setting the predetermined desktop launcher as the default desktop launcher.

The second processor 34 may be further configured to, if the user switches to the second desktop launcher in a setting interface while the system executes the first desktop launcher, loading the second installation program file corresponding to the second desktop launcher being switched to, so as to execute the second desktop launcher, and setting the second desktop launcher being switched to as the default desktop launcher.

The second memory 35 may be configured to store installation program files of the at least two kinds of desktop launchers downloaded by the mobile terminal, and to store the default desktop launcher set by the second processor 34.

The system for customizing a desktop launcher of a mobile terminal provided by the present disclosure differentiates files of the at least two kinds of desktop launchers by naming resource files and configuration files for customizing the at least two kinds of desktop launchers with different names, thereby implementing the independence between the resource files and the configuration files which have been customized. In addition, the saving paths of the at least two kinds of desktop launchers which is in the second file directory is added to the program information file, so as to copy the program information file to folders corresponding to the at least two kinds of desktop launchers which are in the second file directory, thereby implementing the sharing of the program information file of the at least two kinds of desktop launchers. As a result, the at least two desktop launchers could implement the independent customization of configuration file and resource file on demand, while reducing the loading of the system. Furthermore, when a system starts, a setup wizard interface is displayed for a user to selects a demanded desktop launcher. If a user selects the desktop launcher in the setup wizard interface, the desktop launcher selected by the user is executed; if the user does not select the desktop launcher in the setup wizard interface, the predetermined desktop launcher is executed, thereby meeting users' demand for desktop launchers.

The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

What is claimed is:

1. A desktop-launcher-customizing method for a mobile terminal, wherein the mobile terminal comprises at least two kinds desktop launchers, and the at least two kinds of desktop launchers at least comprises a first desktop launcher and a second desktop launcher, comprising:

placing a first resource file for customizing the first desktop launcher into a resource folder within a first file directory, and placing a second resource file for customizing the second desktop launcher into the resource folder within the first file directory, and placing a first configuration file for customizing the first desktop launcher into a configuration folder within the first file directory, and placing a second configuration file for customizing the second desktop launcher into the configuration folder within the first file directory, wherein the first resource file and the second resource file, the resource folder, the first configuration file and the second configuration file, and the configuration folder are different in name;

adding a compilation command, specifying a first saving path of the first resource file and the second resource file and a second saving path of the first configuration file and the second configuration file in the first file directory, and copying the first resource file and the second resource file in the first saving path and the first configuration file and the second configuration file in the second saving path into a second file directory by executing the compilation command, wherein the first resource file and the first configuration file are copied to a first folder for the first desktop launcher in the second file directory, and the second resource file and the second configuration file are copied to a second folder for the second desktop launcher in the second file directory;

writing a third saving path of the first resource file and the first configuration file and a fourth saving path of the second resource file and the second configuration file in the second file directory into a program information file, and copying the program information file to the first folder for the first desktop launcher and the second folder for the second desktop launcher in the second file directory;

reading the third saving path and the fourth saving path from the program information file to obtain the first folder for the first desktop launcher and the second folder for the second desktop launcher in the second file directory, and compiling the first resource file and the first configuration file in the first folder for the first desktop launcher in the second file directory to generate a first installation program file, and compiling the second resource file and the second configuration file in the second folder for the second desktop launcher in the second file directory to generate a second installation program file; and loading the first or second installation program file according to the first or second desktop launcher selected by a user, and executing the first or second desktop launcher.

2. The method of claim 1, before the adding a compilation command corresponding to the first desktop launcher and the second desktop launcher, further comprising:

setting function switch values for customizing the first desktop launcher and the second desktop launcher, such that the first desktop launcher and the second desktop launcher have a corresponding function switch value, respectively.

3. The method of claim 2, wherein each of the function switch values at least comprises the amount of main screens and the amount of navigation bars.

4. The method of claim 1, wherein the loading the first or second installation program file according to the first or second desktop launcher selected by the user, and execute the first or second desktop launcher comprises:

setting one of the at least two kinds of desktop launchers as a predetermined desktop launcher;

displaying a setup wizard interface when a system starts; when a user selects a first or second desktop launcher in the setup wizard interface, loading the first or second installation program file corresponding to the first or second desktop launcher selected by the user, so as to execute the first or second desktop launcher, and setting the first or second desktop launcher selected by the user as a default desktop launcher; when the user does not select the first or second desktop launcher in the setup wizard interface, executing the predetermined desktop launcher, and setting the predetermined desktop launcher as the default desktop launcher;

when the user switches to the second desktop launcher in a setting interface while the system executes the first desktop launcher, loading the second installation program file corresponding to the second desktop launcher being switched to, so as to execute the second desktop launcher, and setting the second desktop launcher being switched to as the default desktop launcher.

5. The method of claim 4, wherein the setting one of the at least two kinds of desktop launchers as the predetermined desktop launcher comprises:

filtering out package names and behaviors of the at least two kinds of desktop launchers, and adding the package name and the behavior of the one of the at least two kinds of desktop launchers to be set to an attribute of a default class, so as to set the one of the at least two kinds of desktop launchers as the predetermined desktop launcher;

the setting the first or second desktop launcher selected by the user as the default desktop launcher comprises:

when the user selects the first or second desktop launcher in the setup wizard interface, adding the package name and the behavior of the first or second desktop launcher selected by the user to the attribute of the default class, so as to set the first or second desktop launcher selected by the user as the default desktop launcher;

the setting the second desktop launcher being switched to as the default desktop launcher comprises:

when the user switches to the second desktop launcher while the system executes the first desktop launcher, adding the package name and the behavior of the second desktop launcher being switched to as the default desktop launcher to the attribute of the default class, so as to set the second desktop launcher being switched to as the default desktop launcher.

6. The method of claim 1, wherein the first or second configuration file for customizing the first or second desktop launcher at least comprises voice, multimedia, character, language, and layout, the first or second resource file for customizing the first or second desktop launcher at least comprises an image resource, and the at least two kinds of desktop launchers share the image resource.

7. A system for customizing a desktop launcher of a mobile terminal, wherein the mobile terminal comprises at least two kinds of desktop launchers, and the at least two kinds of desktop launchers at least comprises a first desktop launcher and a second desktop launcher, comprising:

a first processor configured to:

place a first resource file for customizing the first desktop launcher into a resource folder within a first file directory, and placing a second resource file for customizing the second desktop launcher into the resource folder within the first file directory, and placing a first configuration file for customizing the first desktop launcher into a configuration folder within the first file directory, and placing a second configuration file for customizing the second desktop launcher into the configuration folder within the first file directory, wherein the first resource file and the second resource file, the resource folder, the first configuration file and the second configuration file, and the configuration folder are different in name;

add a compilation command, specify a first saving path of the first resource file and the second resource file and a second saving path of the first configuration file and the second configuration file in the first file directory, and copy the first resource file and the second resource file in the first saving path and the first configuration file and the second configuration file in the second saving path into a second file directory by executing the compilation command, wherein the first resource file and the first configuration file are copied to a first folder for the first desktop launcher in the second file directory, and the second resource file and the second configuration file are copied to a second folder for the second desktop launcher in the second file directory;

write a third saving path of the first resource file and the first configuration file and a fourth saving path of the second resource file and the second configuration file in the second file directory into a program information file, and copy the program information file to the first folder for the first desktop launcher and the second folder for the second desktop launcher in the second file directory; and read the third saving path and the fourth saving path from the program information file to obtain the first folder for the first desktop launcher and the second folder for the second desktop launcher in the second file directory, and compile the first resource file and the first configuration file in the first folder for the first desktop launcher in the second file directory to generate a first installation program file, and compile the second resource file and the second configuration file in the second folder for the second desktop launcher in the second file directory to generate a second installation program file;

a first memory configured to store the first and second resource files and the first and second configuration files in the first file directory and the first and second installation program files generated by compiling; and a second processor configured to set one of the at least two kinds of desktop launchers as a predetermined desktop launcher.

8. The system of claim 7, wherein the second processor is further configured to load the first or second installation program file corresponding to the first or second desktop launcher, so as to execute the first or second desktop launcher, and set the first or second desktop launcher as a default desktop launcher.

9. The system of claim 8, further comprising:
a second memory configured to store the first or second installation program file of the first or second desktop launcher downloaded by the mobile terminal, and to store the default desktop launcher set by the second processor.

10. A non-transitory computer readable storage medium having instructions stored thereon, wherein a mobile terminal comprises at least two kinds of desktop launchers, and the at least two kinds of desktop launchers at least comprises a first desktop launcher and a second desktop launcher, and the instructions, when executed by one or more processors, cause the processors to perform operations comprising:

placing a first resource file for customizing the first desktop launcher into a resource folder within a first file directory, and placing a second resource file for customizing the second desktop launcher into the resource folder within the first file directory, and placing a first configuration file for customizing the first desktop launcher into a configuration folder within the first file directory, and placing a second configuration file for customizing the second desktop launcher into the configuration folder within the first file directory, wherein the first resource file and the second resource file, the resource folder, the first configuration file and the second configuration file, and the configuration folder are different in name;

adding a compilation command, specifying a first saving path of the first resource file and the second resource file and a second saving path of the first configuration file and the second configuration file in the first file directory, and copying the first resource file and the second resource file in the first saving path and the first configuration file and the second configuration file in the second saving path into a second file directory by executing the compilation command, wherein the first resource file and the first configuration file are copied to a first folder for the first desktop launcher in the second file directory, and the second resource file and the second configuration file are copied to a second folder for the second desktop launcher in the second file directory;

writing a third saving path of the first resource file and the first configuration file and a fourth saving path of the second resource file and the second configuration file in the second file directory into a program information file, and copying the program information file to the first folder for the first desktop launcher and the second folder for the second desktop launcher in the second file directory;

reading the third saving path and the fourth saving path from the program information file to obtain the first folder for the first desktop launcher and the second folder for the second desktop launcher in the second file directory, and compiling the first resource file and the first configuration file in the first folder for the first desktop launcher in the second file directory to generate a first installation program file, and compiling the second resource file and the second configuration file in the second folder for the second desktop launcher in the second file directory to generate a second installation program file; and loading the first or second installation program file according to the first or second desktop launcher selected by a user, and executing the first or second desktop launcher.

11. The non-transitory computer readable storage medium of claim 10, wherein the operations further comprise:
setting function switch values for customizing the first desktop launcher and the second desktop launcher, such that the first desktop launcher and the second desktop launcher have a corresponding function switch value, respectively.

12. The non-transitory computer readable storage medium of claim 10, wherein the operations further comprise:
setting one of the at least two kinds of desktop launchers as a predetermined desktop launcher;
displaying a setup wizard interface when a system starts; when a user selects a first or second desktop launcher in the setup wizard interface, loading the first or second installation program file corresponding to the first or second desktop launcher selected by the user, so as to execute the first or second desktop launcher, and setting the first or second desktop launcher selected by the user as a default desktop launcher; when the user does not select the first or second desktop launcher in the setup wizard interface, executing the predetermined desktop launcher, and setting the predetermined desktop launcher as the default desktop launcher;
when the user switches to the second desktop launcher in a setting interface while the system executes the first desktop launcher, loading the second installation program file corresponding to the second desktop launcher being switched to, so as to execute the second desktop launcher, and setting the second desktop launcher being switched to as the default desktop launcher.

13. The non-transitory computer readable storage medium of claim 12, wherein the operations further comprise:

filtering out package names and behaviors of the at least two kinds of desktop launchers, and adding the package name and the behavior of the one of the at least two kinds of desktop launchers to be set to an attribute of a default class, so as to set the one of the at least two kinds of desktop launchers as the predetermined desktop launcher;

when the user selects the first or second desktop launcher in the setup wizard interface, adding the package name and the behavior of the first or second desktop launcher selected by the user to the attribute of the default class, so as to set the first or second desktop launcher selected by the user as the default desktop launcher;

when the user switches to the second desktop launcher while the system executes the first desktop launcher, adding the package name and the behavior of the second desktop launcher being switched to as the default desktop launcher to the attribute of the default class, so as to set the second desktop launcher being switched to as the default desktop launcher.

* * * * *